United States Patent [19]

Littmann

[11] Patent Number: 4,508,170

[45] Date of Patent: Apr. 2, 1985

[54] METHOD OF INCREASING THE YIELD OF HYDROCARBONS FROM A SUBTERRANEAN FORMATION

[76] Inventor: Wolfgang Littmann, Bleichenstrasse 32, D-3050 Wunstorf 2 (Steinhude), Fed. Rep. of Germany

[21] Appl. No.: 461,668

[22] Filed: Jan. 27, 1983

[30] Foreign Application Priority Data

Jan. 27, 1982 [DE] Fed. Rep. of Germany ....... 3202492

[51] Int. Cl.$^3$ ............................................. E21B 43/24
[52] U.S. Cl. ...................................... 166/272; 166/261; 166/274
[58] Field of Search ............... 166/261, 272, 274, 275, 166/303

[56] References Cited

U.S. PATENT DOCUMENTS

| | | | |
|---|---|---|---|
| 3,131,761 | 5/1964 | Scott | 166/261 |
| 3,135,326 | 6/1964 | Santee | 166/272 |
| 3,204,694 | 9/1965 | Johnson, Jr. et al. | 166/272 X |
| 3,302,713 | 2/1967 | Ahearn et al. | 166/272 X |
| 3,347,313 | 10/1967 | Matthews et al. | 166/272 |
| 3,353,598 | 11/1967 | Smith | 166/272 X |
| 3,373,814 | 3/1968 | Ellers et al. | |
| 3,439,743 | 4/1969 | Wyllie | 166/272 |
| 3,477,510 | 11/1969 | Spillette | 166/272 |
| 3,483,924 | 12/1969 | Blevins et al. | 166/272 |
| 3,572,437 | 3/1971 | Marberry et al. | 166/272 |
| 3,648,771 | 3/1972 | Kelly et al. | 166/272 |
| 3,802,508 | 4/1974 | Kelly et al. | 166/272 |
| 3,823,776 | 7/1974 | Holmes | 166/261 |
| 3,958,636 | 5/1976 | Perkins | 166/248 |
| 4,084,637 | 4/1978 | Todd | 166/272 X |
| 4,223,730 | 9/1980 | Schulz et al. | 166/272 |

FOREIGN PATENT DOCUMENTS 943750  3/1974  Canada ................................ 166/272

OTHER PUBLICATIONS

Chang, "Polymer Flooding Technology-Yesterday, Today, and Tomorrow", *Journal of Petroleum Technology*, Aug. 1978, pp. 1113–1128.

*Primary Examiner*—George A. Suchfield

[57] ABSTRACT

Heavy crude oil is recovered from a subterranean formation by a process comprising
(a) heating said formation, and
(b) subsequently flooding the formation with a cold aqueous solution containing a polymer additive which increases its viscosity.

7 Claims, 3 Drawing Figures

METHOD OF INCREASING THE YIELD OF HYDROCARBONS FROM A SUBTERRANEAN FORMATION

BACKGROUND OF THE INVENTION

1. Field of the Invention

This invention relates to processes for recovery of heavy petroleum from subterranean formations and more particularly to such processes which employ a fluid medium to displace the petroleum.

2. Description of the Prior Art

In many oil-bearing subterranean formations the crude oil is under a pressure which forces it out of the formation to a production well from which it can be brought to the surface. However, in the case of heavy oil reservoirs, this recovery of crude oil, which is generally designated as the primary recovery phase, results in the recovery of only a very small part of the crude, if indeed of any at all. This is due to the fact that heavy oils flow poorly or not at all due to their high viscosity under the initial conditions in the reservoir. For this reason heat is supplied to such reservoirs, which decreases the viscosity of the crude, thus rendering it mobile.

Heat is usually supplied into the reservoir by the injection of hot water or steam into an injection well located at a suitable distance from the production well(s). In addition to heating the reservoir, the injected water or steam acts at the same time as a displacing agent for the crude oil which has become mobile as a result of the supply of heat. This does considerably increase the yield from a heavy oil reservoir, or makes it possible in the first place, but this yield is still far below the yields obtained in deposits of medium and light crude oils. One reason for this is that the viscosities of the displacing agents, hot water or steam, are much less than that of heavy oil, for which reason the heavy oil is not completely displaced. Moreover, when steam-drive is used, the existence of different densities causes the steam to concentrate in the upper part of the reservoir and to break through rapidly to the recovery well, so that it is not possible to build up a pressure gradient in the reservoir which is sufficient to displace the crude.

On the other hand, it is known that the degree of displacement in the recovery of crude oil by flooding can be considerably increased if small amounts of viscosity-increasing hydrophilic polymers are added to the flooding water. Suitable polymers are, for example, polysaccharides, hydroxyethylcelluloses and especially unhydrolyzed or only partially hydrolyzed polyacrylamides. However, since these chemicals are generally temperature-sensitive, they cannot be readily used for the recovery of heavy oil by hot water flooding.

Hence a need has continued to exist for a method of displacing heavy crude from underground formations which avoids the problems of the methods used hitherto.

SUMMARY OF THE INVENTION

Accordingly, it is an object of the invention to provide a method for displacing heavy crude oil from a subterranean formation.

A further object is to provide a method for displacing heavy crude oil from a subterranean formation which enables recovery of a high percentage of the crude present in the formation.

A further object is to provide an economical method for displacing heavy crude oil from a subterranean formation.

Further objects of the invention will become apparent from the description of the invention which follows.

The objects of the invention are attained by a process comprising
 (a) heating the formation, and
 (b) subsequently, flooding the formation with a cold aqueous solution containing a polymer additive which increases its viscosity.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DETAILED DESCRIPTION OF THE INVENTION AND PREFERRED EMBODIMENTS

The formation can be heated in various ways, e.g., by burning off a part of the heavy oil using oxygen or air. It is also possible to heat the formation by electric heating. However, the preferred method is to heat the formation with injected steam or hot water, as mentioned above. The formation should reach temperatures between 50° and 350° C. Temperatures between 100° and 250° C. are preferred, and as a rule the temperature of the formation at the injection well is higher than at the production well.

Hydroxyethylcellulose or polysaccharides can be used as viscosity-raising polymers. It is preferable to use polyacrylamides which are not hydrolyzed or only patially hydrolyzed. It is also possible to add surfactants to the solutions along with the polymers, e.g. alkali salts of sulfate esters of alkoxylated alkyl, aryl or alkylaryl hydroxy compounds.

The amounts of polymer are adjusted so that the viscosity of the solution at the temperature reached during the displacement of the heavy oil reaches at least the viscosity of the heavy oil to be displaced at this temperature. The amount of polymer required is generally 0.5 to 30, preferably 1 to 6 $kgm^{-3}$. The polymer solution is introduced at such a temperature that its temperature in the formation does not increase so much that the polymers lose their viscosity-increasing properties. In the case of the preferred, unhydrolyzed or partially hydrolyzed polyacrylamides this temperature limit is 110° to 130° C. In order to avoid exceeding this temperature, the polymer solution used for post-flooding should be introduced at temperatures between 5° and 50°, preferably 15° and 30° C.

The method of the invention can be used not only in heavy oil reservoirs. It can also be used for other, similar deposits, in particular bitumen deposits and tar sands as well as in deposits of light and medium crudes.

Having generally described the invention, a more complete understanding can be obtained by reference to certain specific examples, which are provided herein for purposes of illustration only and are not intended to be limiting unless otherwise specified.

EXAMPLE

Figure 1:
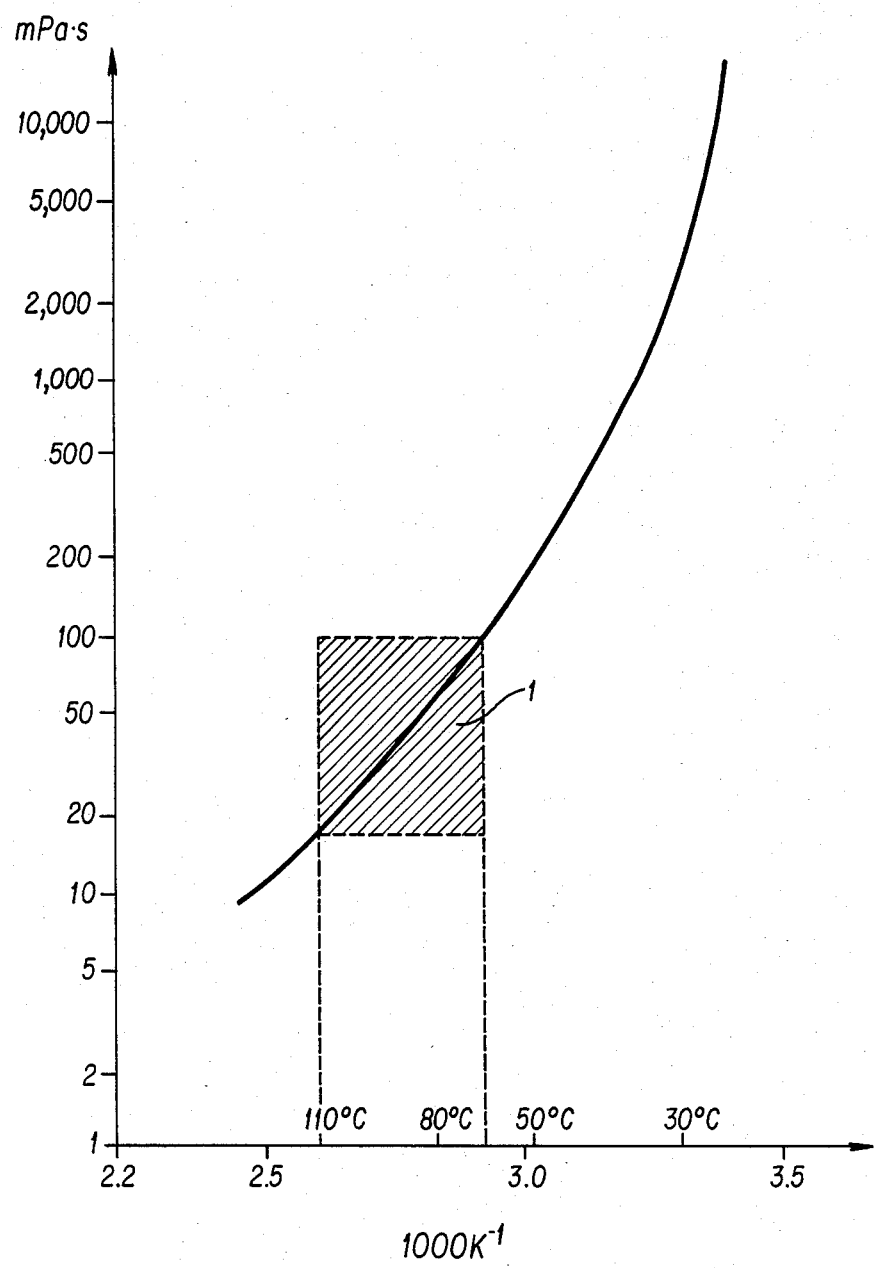
FIG. 1 is a graph of the viscosity of the crude oil of Example 1 versus the reciprocal of the absolute temperature.

A heavy oil with a viscosity of 1600 mPa.s at a reservoir temperature of 23° C. was to be recovered from a stratum having a thickness of 8.5 m, a permeability of 1.5 $\mu m^2$ and a porosity of 30%. FIG. 1 shows the viscosity of this oil in mPa.s versus the reciprocal of the absolute temperature. The reference character 1 designates the range of viscosities between 15 and 100 mPa.s which is associated with reciprocal temperatures between 0.0029 and 0.0026 $K^{-1}$ corresponding to 70° to 100° C. This is the range in which unhydrolyzed or partially hydrolyzed polyacrylamides are sufficiently stable and the mobility of the heavy oil is such that it can be recovered.

Hot water at a temperature of 270° C. and a pressure of 54 bar was introduced at a rate of 5 $m^3h^{-1}$ into an injection well surrounded by 4 production wells, each at a distance of 70 m. After 500 days the temperature profile represented by curve 2 in FIG. 2 as a function of the distance from the injection well had developed.

Figure 2:
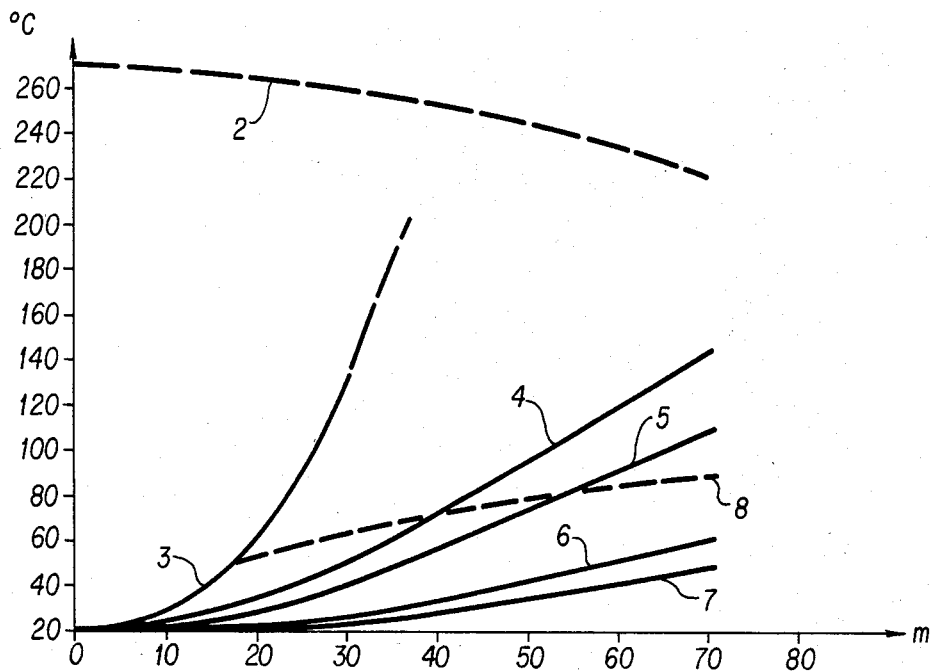
FIG. 2 shows the temperature profile of the reservoir in Example 1 after various periods of heating.

Subsequently, a flushing was performed with 5 $m^3h^{-1}$ of a solution containing 1.5 $kgm^{-3}$ of polymer. Partially hydrolyzed polyacrylamide in fresh water was used as the polymer solution. The solution had a temperature of 20° C. In FIG. 2 the temperature profile in the reservoir after 10 days is represented by curve 3, after 50 days by curve 4, after 100 days by curve 5, after 500 days by curve 6 and after 1000 days by curve 7. Curve 8 shows the temperature profile at the front edge of the cold water containing the polymer. The highest temperature of 90° C. was reached after approximately 150 days. It was still distinctly below the temperatures at which a noticeable breakdown of the polymer might occur.

Figure 3:
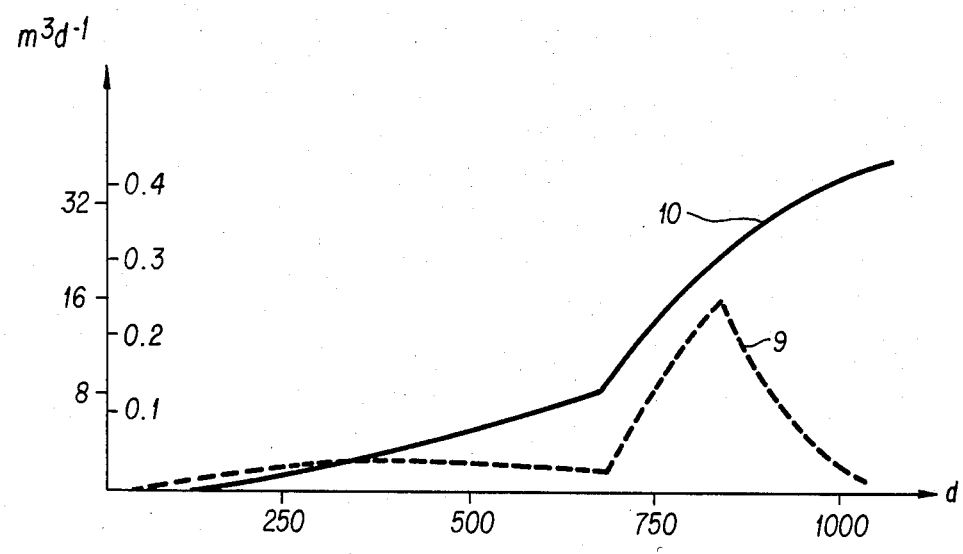
FIG. 3 shows the production rate as a function of time for Example 1.

In FIG. 3 curve 9 represents the production rate in $m^3d^{-1}$ (left scale of the ordinate) and curve 10 represents the degree of crude oil displacement from the formation (right scale of the ordinate) in relation to the production time in days. The production rate did not reach 1 $m^3d^{-1}$ during the hot water flooding and rose when the polymer front reached the production holes to about 16 $m^3d^{-1}$. While the degree of crude oil displacement did not reach 15% during hot flooding alone, the subsequent flooding with cold polymer solution resulted in a degree of crude oil displacement greater than 40%.

Having now fully described the invention, it will be apparent to one of ordinary skill in the art that many changes and modifications can be made thereto without departing from the spirit or scope of the invention as set forth herein.

What is claimed as new and sought to be protected by Letters Patent of the United States is:

1. A process for increasing the yield of hydrocarbons from a subterranean formation consisting essentially of:
   (a) passing either hot water without additives or steam into the formation, thereby heating said formation to a temperature of 100° to 250° C., and
   (b) subsequently flooding the formation with a cold aqueous solution containing a polymer additive which increases its viscosity.
2. The process of claim 1 wherein said polymer additive is a polysaccharide.
3. The process of claim 1 wherein said polymer is selected from the group consisting of hydroxyethylcellulose, unhydrolyzed polyacrylamide, and partially hydrolyzed polyacrylamide.
4. The process of claim 1 wherein said aqueous solution contains 0.5 to 30 $kgm^{-3}$ of said polymer.
5. The process of claim 4 wherein said solution contains 1 to 6 $kgm^{-3}$ of said polymer.
6. The process of claim 1 wherein said aqueous solution has a temperature of 5° to 50° C.
7. The process of claim 6 wherein said aqueous solution has a temperature of 15° to 30° C.

* * * * *